(No Model.)
A. B. NEIMAN & L. M. MELHORN.
NUT LOCK.
No. 383,366. Patented May 22, 1888.
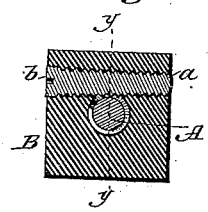
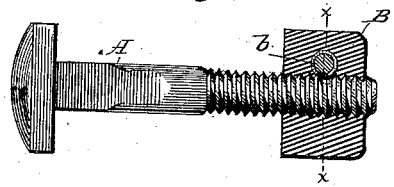
WITNESSES:
Fred G. Dieterich
Edw. U. Byrn
INVENTOR:
A. B. Neiman
L. M. Melhorn
BY Munn & Co
ATTORNEYS.

UNITED STATES PATENT OFFICE.

ALVIN B. NEIMAN AND LEWIS M. MELHORN, OF YORK, PENNSYLVANIA.

NUT-LOCK.

SPECIFICATION forming part of Letters Patent No. 383,366, dated May 22, 1888.

Application filed September 22, 1887. Serial No. 250,415. (No model.)

*To all whom it may concern:*

Be it known that we, ALVIN B. NEIMAN and LEWIS M. MELHORN, of York, in the county of York and State of Pennsylvania, have invented a new and useful Improvement in Nut-Locks, of which the following is a specification.

Our invention is in the nature of an improved means for securely locking a nut upon its bolt, so that it may not be accidentally dislodged.

It consists in a nut having a tapered screw-hole tapped through the same at right angles to the bolt-hole and cutting into the same, in combination with a tapered screw-plug, which when turned into said tapered hole cuts the threads of the bolt at right angles, at first cutting the threads but slightly, and then deeper and deeper as the plug is turned in, after the manner of a screw-cutting tap, until its threads are finally deeply embedded crosswise into the threads of the bolt, thus locking the nut thereon.

Figure 1 is a section through line $xx$ of Fig. 2, and Fig. 2 is a section through line $yy$ of Fig. 1.

A represents an ordinary form of bolt, and B is its nut, which has the usual screw-threaded hole to receive the bolt. Through the nut, at right angles to the bolt hole, is formed a tapered screw-threaded hole, $a$, which intersects at right angles one edge of the bolt-hole. This tapered and threaded hole $a$ is designed to receive a tapered screw-plug, $b$. When this nut is screwed upon the bolt and the screw-plug is turned into its tapered hole, the screw-threads of the smaller end of the plug commence to cut transverse grooves in the threads of the bolt, and as the screw-plug is turned in, its greater diameter gradually cuts into the bolt deeper and deeper until a strong locking-hold is secured, which prevents the nut from ever turning upon the bolt.

We are aware that it is not broadly new to cramp or bind a nut upon a bolt by means of a set-screw, and that a pin has been inserted through a hole in the nut transversely to the bolt-hole and made to lock the nut by a lug or spur which was thrown into the threads of the bolt. In the latter case, however, the slightest turn would allow the pin to come out, and in the former case there was only a binding or cramping effect and no positive lock, such as is secured in our invention by the progressive burying of the tapered screw deeply into the threads of the bolt at right angles.

An important feature of our invention is that the threads on the tapered screw-plug are so interlocked with the threads on the bolt that when the nut is turned back it draws in and tightens the plug, the threads operating like cogs on wheels. In other words, the nut could not be turned back or loosened without tending to drawing the plug farther in.

Having thus described our invention, what we claim as new is—

The combination of a screw-nut having a tapered and threaded hole at right angles to and intersecting the bolt-hole on one side tangential thereto, and a tapered screw-plug fitted to enter said hole and cause a progressive burying of its threads transversely into the threads of the bolt, substantially as and for the purpose described.

ALVIN B. NEIMAN.
LEWIS M. MELHORN.

Witnesses:
H. H. McCLUNE,
LEVI MAISH.